United States Patent
Manzano et al.

(10) Patent No.: US 12,045,196 B2
(45) Date of Patent: Jul. 23, 2024

(54) ARCHITECTURE FOR MANAGEMENT OF DIGITAL FILES ACROSS DISTRIBUTED NETWORK

(71) Applicant: Topia Technology, Inc., Tacoma, WA (US)

(72) Inventors: Michael R. Manzano, Seattle, WA (US); John C. Haager, Buckley, WA (US)

(73) Assignee: Topia Technology, Inc., Gig Harbor, WA (US)

( * ) Notice: Subject to any disclaimer, the term of this patent is extended or adjusted under 35 U.S.C. 154(b) by 0 days.

(21) Appl. No.: 17/941,518

(22) Filed: Sep. 9, 2022

(65) Prior Publication Data

US 2023/0004527 A1    Jan. 5, 2023

Related U.S. Application Data

(63) Continuation of application No. 17/306,548, filed on May 3, 2021, which is a continuation of application
(Continued)

(51) Int. Cl.
*G06F 16/00* (2019.01)
*G06F 15/16* (2006.01)
(Continued)

(52) U.S. Cl.
CPC ............ *G06F 16/122* (2019.01); *G06F 15/16* (2013.01); *G06F 16/00* (2019.01); *G06F 16/10* (2019.01);
(Continued)

(58) Field of Classification Search
CPC .. G06F 16/122; G06F 16/182; G06F 16/1873; G06F 16/176; G06F 16/178;
(Continued)

(56) References Cited

U.S. PATENT DOCUMENTS

| | | | |
|---|---|---|---|
| 5,600,834 | A | 2/1997 | Howard |
| 5,675,802 | A | 10/1997 | Allen |

(Continued)

FOREIGN PATENT DOCUMENTS

| | | |
|---|---|---|
| EP | 1 130 511 A2 | 9/2001 |
| WO | WO 98/56149 A1 | 12/1998 |

(Continued)

OTHER PUBLICATIONS

FolderShare—Secure Remote Access VPN Solution; Document Management & Real-time File Mirroring Solution; <https://web.archive.org/web/20040804020435/http://www.foldershare.com:80/>; Aug. 4, 2004.
(Continued)

*Primary Examiner* — Srirama Channavajjala
(74) *Attorney, Agent, or Firm* — Sughrue Mion, PLLC

(57) ABSTRACT

A server system, based on content of a first file stored on a first client device being modified, automatically receives a copy of the modified first file from a first transfer client, implemented on the first client device, the copy of the modified first file being an updated version of the first file generated from content of the first file being modified. The server system receives, from the first transfer client, first metadata associated with the updated version of the first file, the first metadata being assigned a first priority greater than a second priority assigned to the copy of the modified first file. The server system automatically transfers the first metadata to a second transfer client, implemented on a second client device, before the copy of the modified first file is transferred to the second transfer client to be stored on the second client device.

14 Claims, 3 Drawing Sheets

Related U.S. Application Data

No. 16/361,641, filed on Mar. 22, 2019, now Pat. No. 11,003,622, which is a continuation of application No. 16/017,348, filed on Jun. 25, 2018, now Pat. No. 10,289,607, which is a continuation of application No. 14/860,289, filed on Sep. 21, 2015, now Pat. No. 10,067,942, which is a continuation of application No. 12/267,852, filed on Nov. 10, 2008, now Pat. No. 9,143,561.

(60) Provisional application No. 60/986,896, filed on Nov. 9, 2007.

(51) Int. Cl.

| | | |
|---|---|---|
| *G06F 16/10* | (2019.01) | |
| *G06F 16/11* | (2019.01) | |
| *G06F 16/13* | (2019.01) | |
| *G06F 16/14* | (2019.01) | |
| *G06F 16/176* | (2019.01) | |
| *G06F 16/178* | (2019.01) | |
| *G06F 16/18* | (2019.01) | |
| *G06F 16/182* | (2019.01) | |
| *G06F 16/2457* | (2019.01) | |
| *H04L 67/1095* | (2022.01) | |

(52) U.S. Cl.
CPC ............ *G06F 16/128* (2019.01); *G06F 16/13* (2019.01); *G06F 16/14* (2019.01); *G06F 16/176* (2019.01); *G06F 16/178* (2019.01); *G06F 16/182* (2019.01); *G06F 16/1873* (2019.01); *G06F 16/24573* (2019.01); *H04L 67/1095* (2013.01)

(58) Field of Classification Search
CPC .. G06F 16/10; G06F 16/128; G06F 16/24573; G06F 16/38; G06F 16/383; G06F 16/48; G06F 16/483; G06F 16/58; G06F 16/583
See application file for complete search history.

(56) References Cited

U.S. PATENT DOCUMENTS

| | | |
|---|---|---|
| 5,806,078 A | 9/1998 | Hug |
| 5,909,581 A | 6/1999 | Park |
| 5,920,867 A | 7/1999 | Van Huben |
| 6,026,414 A | 2/2000 | Anglin |
| 6,088,693 A | 7/2000 | Van Huben |
| 6,154,817 A | 11/2000 | Mohan et al. |
| 6,260,069 B1 | 7/2001 | Anglin |
| 6,449,624 B1 | 9/2002 | Hammack et al. |
| 6,463,463 B1 | 10/2002 | Godfrey et al. |
| 6,504,994 B2 | 1/2003 | Kawamura et al. |
| 6,505,200 B1 | 1/2003 | Ims et al. |
| 6,526,418 B1 | 2/2003 | Midgley |
| 6,606,646 B2 | 8/2003 | Feigenbaum |
| 6,611,849 B1 | 8/2003 | Raff et al. |
| 6,671,700 B1 | 12/2003 | Creemer et al. |
| 6,708,221 B1 | 3/2004 | Mendez et al. |
| 6,757,696 B2 | 6/2004 | Multer et al. |
| 6,757,893 B1 | 6/2004 | Haikin |
| 6,760,759 B1 | 7/2004 | Chan |
| 6,810,405 B1 | 10/2004 | LaRue et al. |
| 6,826,626 B1 | 11/2004 | McManus |
| 6,829,622 B2 | 12/2004 | Beyda |
| 6,874,037 B1 | 3/2005 | Abram et al. |
| 6,931,454 B2 | 8/2005 | Deshpande et al. |
| 6,990,522 B2 | 1/2006 | Wu |
| 7,024,428 B1 | 4/2006 | Huang et al. |
| 7,035,847 B2 | 4/2006 | Brown et al. |
| 7,051,364 B1 | 5/2006 | Tackman |
| 7,054,594 B2 | 5/2006 | Bloch et al. |
| 7,058,667 B2 | 6/2006 | Goldick |
| 7,065,658 B1 | 6/2006 | Baraban et al. |
| 7,089,307 B2 | 8/2006 | Zintel et al. |
| 7,136,934 B2 | 11/2006 | Carter et al. |
| 7,149,760 B1 | 12/2006 | Breuer |
| 7,155,488 B1 | 12/2006 | Lunsford et al. |
| 7,162,501 B2 | 1/2007 | Kupkova |
| 7,224,973 B2 | 5/2007 | Tsutazawa et al. |
| 7,243,163 B1 | 7/2007 | Friend et al. |
| 7,260,646 B1 | 8/2007 | Stefanik et al. |
| 7,263,493 B1 | 8/2007 | Provost |
| 7,269,433 B2 | 9/2007 | Vargas et al. |
| 7,290,244 B2 | 10/2007 | Peck et al. |
| 7,325,038 B1 | 1/2008 | Wang |
| 7,340,534 B2 | 3/2008 | Cameron et al. |
| 7,398,327 B2 | 7/2008 | Lee |
| 7,415,588 B2 | 8/2008 | Hong et al. |
| 7,415,615 B2 | 8/2008 | Skygebjer |
| 7,457,631 B2 | 11/2008 | Yach et al. |
| 7,467,353 B2 | 12/2008 | Kurlander et al. |
| 7,483,925 B2 | 1/2009 | Koskimies et al. |
| 7,526,575 B2 | 4/2009 | Rabbers et al. |
| 7,529,778 B1 | 5/2009 | Dewey |
| 7,574,711 B2 | 8/2009 | Zondervan et al. |
| 7,584,186 B2 | 9/2009 | Chen et al. |
| 7,587,446 B1 | 9/2009 | Onyon et al. |
| 7,593,966 B2 * | 9/2009 | Therrien ............ G06F 11/1448 707/999.102 |
| 7,613,773 B2 | 11/2009 | Watt |
| 7,639,116 B2 | 12/2009 | Saunders |
| 7,657,271 B2 | 2/2010 | Kim |
| 7,680,838 B1 | 3/2010 | Shaw |
| 7,680,885 B2 | 3/2010 | Schauser et al. |
| 7,707,165 B1 | 4/2010 | Jiang |
| 7,752,166 B2 | 7/2010 | Quinlan et al. |
| 7,761,414 B2 | 7/2010 | Freedman |
| 7,788,303 B2 | 8/2010 | Mikesell et al. |
| 7,796,779 B1 | 9/2010 | Strong et al. |
| 7,885,925 B1 | 2/2011 | Strong et al. |
| 7,895,334 B1 | 2/2011 | Tu et al. |
| 7,987,420 B1 | 7/2011 | Kloba et al. |
| 8,009,966 B2 | 8/2011 | Bloom et al. |
| 8,019,900 B1 | 9/2011 | Sekar et al. |
| 8,112,549 B2 | 2/2012 | Srinivasan et al. |
| 8,208,792 B2 | 6/2012 | Morioka |
| 8,244,288 B2 | 8/2012 | Chipchase |
| 8,321,534 B1 | 11/2012 | Roskind et al. |
| 8,370,423 B2 | 2/2013 | Ozzie et al. |
| 8,386,558 B2 | 2/2013 | Schleifer et al. |
| 8,504,519 B1 | 8/2013 | Sachs |
| 8,565,729 B2 | 10/2013 | Moseler et al. |
| 8,595,182 B1 | 11/2013 | Nelson |
| 8,874,534 B2 | 10/2014 | March |
| 9,143,561 B2 | 9/2015 | Manzano |
| 10,067,942 B2 | 9/2018 | Manzano |
| 10,289,607 B2 | 5/2019 | Manzano |
| 2002/0026478 A1 | 2/2002 | Rodgers et al. |
| 2002/0035697 A1 | 3/2002 | McCurdy |
| 2002/0055942 A1 | 5/2002 | Reynolds |
| 2002/0087588 A1 | 7/2002 | McBride et al. |
| 2002/0143795 A1 | 10/2002 | Fletcher |
| 2002/0184318 A1 | 12/2002 | Pineau |
| 2002/0194382 A1 | 12/2002 | Kausik |
| 2003/0028514 A1 | 2/2003 | Lord |
| 2003/0028542 A1 | 2/2003 | Muttik et al. |
| 2003/0038842 A1 | 2/2003 | Peck et al. |
| 2003/0061350 A1 | 3/2003 | Masuoka et al. |
| 2003/0074376 A1 | 4/2003 | Benayoun |
| 2003/0078946 A1 | 4/2003 | Costello |
| 2003/0115547 A1 | 6/2003 | Ohwada |
| 2003/0125057 A1 | 7/2003 | Pesola |
| 2003/0135565 A1 | 7/2003 | Estrada |
| 2003/0233241 A1 | 12/2003 | Marsh |
| 2004/0003013 A1 | 1/2004 | Coulthard |
| 2004/0031027 A1 | 2/2004 | Hiltgen |
| 2004/0049345 A1 | 3/2004 | McDonough et al. |
| 2004/0088348 A1 | 5/2004 | Yeager |
| 2004/0093361 A1 | 5/2004 | Therrien et al. |
| 2004/0107225 A1 | 6/2004 | Rudoff |
| 2004/0133629 A1 | 7/2004 | Reynolds |

(56) References Cited

U.S. PATENT DOCUMENTS

| | | | |
|---|---|---|---|
| 2004/0158817 A1 | 8/2004 | Okachi | |
| 2004/0172424 A1 | 9/2004 | Edelstein et al. | |
| 2004/0267697 A1 | 12/2004 | Hamidi | |
| 2005/0027757 A1 | 2/2005 | Kiessig | |
| 2005/0091316 A1 | 4/2005 | Ponce et al. | |
| 2005/0097225 A1 | 5/2005 | Glatt et al. | |
| 2005/0165722 A1 | 7/2005 | Cannon | |
| 2005/0177602 A1 | 8/2005 | Kaler | |
| 2005/0188051 A1 | 8/2005 | Sneh | |
| 2005/0192966 A1 | 9/2005 | Hilbert | |
| 2005/0210371 A1 | 9/2005 | Pollock | |
| 2005/0220080 A1 | 10/2005 | Ronkainen et al. | |
| 2005/0223047 A1 | 10/2005 | Shah | |
| 2006/0004698 A1 | 1/2006 | Pyhalammi | |
| 2006/0010150 A1 | 1/2006 | Shaath et al. | |
| 2006/0026567 A1 | 2/2006 | McVoy | |
| 2006/0058907 A1 | 3/2006 | Suderman | |
| 2006/0074985 A1 | 4/2006 | Wolfish | |
| 2006/0101064 A1 | 5/2006 | Strong et al. | |
| 2006/0129627 A1 | 6/2006 | Phillips | |
| 2006/0136446 A1* | 6/2006 | Hughes | G06F 16/10 |
| 2006/0143129 A1 | 6/2006 | Holm | |
| 2006/0168118 A1 | 7/2006 | Godlin | |
| 2006/0189348 A1 | 8/2006 | Montulli et al. | |
| 2006/0224626 A1 | 10/2006 | Lakshminath | |
| 2006/0242206 A1 | 10/2006 | Brezak et al. | |
| 2007/0014314 A1 | 1/2007 | O'Neil | |
| 2007/0016629 A1 | 1/2007 | Reinsch | |
| 2007/0022158 A1 | 1/2007 | Vasa | |
| 2007/0027936 A1 | 2/2007 | Stakutis | |
| 2007/0100913 A1 | 5/2007 | Sumner et al. | |
| 2007/0124334 A1 | 5/2007 | Pepin | |
| 2007/0174246 A1 | 7/2007 | Sigurdsson | |
| 2007/0180084 A1* | 8/2007 | Mohanty | G06F 11/1464 709/223 |
| 2007/0191057 A1 | 8/2007 | Kamada | |
| 2007/0203927 A1 | 8/2007 | Cave | |
| 2007/0238440 A1 | 10/2007 | Sengupta et al. | |
| 2007/0239725 A1 | 10/2007 | Bhat | |
| 2008/0005114 A1* | 1/2008 | Li | H04L 67/1068 707/999.009 |
| 2008/0005195 A1 | 1/2008 | Li | |
| 2008/0005280 A1 | 1/2008 | Adams | |
| 2008/0086494 A1 | 4/2008 | Heller et al. | |
| 2008/0168526 A1 | 7/2008 | Robbin et al. | |
| 2008/0243828 A1* | 10/2008 | Reztlaff | G06F 16/3331 707/999.005 |
| 2008/0288578 A1 | 11/2008 | Silfverberg | |
| 2009/0013009 A1 | 1/2009 | Nakayama | |
| 2009/0013010 A1* | 1/2009 | Fang | H04L 67/02 707/999.203 |
| 2009/0024922 A1 | 1/2009 | Markowitz et al. | |
| 2009/0037718 A1 | 2/2009 | Ganesh | |
| 2009/0063711 A1 | 3/2009 | Finkelstein | |
| 2009/0282050 A1 | 11/2009 | Thomas et al. | |
| 2012/0192064 A1 | 7/2012 | Antebi | |
| 2013/0226871 A1 | 8/2013 | Sarnowski | |
| 2013/0226872 A1 | 8/2013 | Barefoot | |
| 2014/0053227 A1 | 2/2014 | Ruppin | |
| 2016/0125058 A1 | 5/2016 | Jain | |

FOREIGN PATENT DOCUMENTS

| | | | |
|---|---|---|---|
| WO | 00/75781 A1 | 12/2000 | |
| WO | 03/032126 A2 | 4/2003 | |
| WO | WO 2007/047302 A2 | 4/2007 | |
| WO | WO 2007144891 A1 * | 12/2007 | |
| WO | 2009/062182 A1 | 5/2009 | |

OTHER PUBLICATIONS

FolderShare; Your Files Anywhere; <https://web.archive.org/web/20030808183932/http://www.foldershare.com:80/>; Aug. 8, 2003.

FolderShare Secure Remote Access VPN Solution; Need your files on more than one computer?; <https://web.archive.org/web/20040814015727/http://www.foldershare.com:80/>; Aug. 14, 2004.

FolderShare—Secure Remote Access VPN Solution; Need your files on more than one computer?; <https://web.archive.org/web/20040820052105/http://www.foldershare.com:80/>; Aug. 20, 2004.

FolderShare Secure Remote Access VPN Solution; Need your files on more than one computer?; <https://web.archive.org/web/20041211020957/http://foldershare.com:80/>; Dec. 11, 2004.

FolderShare Secure Remote Access VPN Solution; Need your files on more than one computer?; <https://web.archive.org/web/20041217041726/http://foldershare.com:80/>; Dec. 17, 2004.

FolderShare; Your Smart File Transfer Solution; <https://web.archive.org/web/20031220151508/http://www.foldershare.com:80/>; Dec. 20, 2003.

FolderShare Secure Remote Access VPN Solution; Need your files on more than one computer?; <https://web.archive.org/web/20041230211050/http://www.foldershare.com:80/>; Dec. 30, 2004.

FolderShare Secure Remote Access VPN Solution; Document Management & Real-time File Mirroring Solution; https://web.archive.org/web/20040701113739/http://foldershare.com:80/>; Jul. 1, 2004.

FolderShare Secure Remote Access VPN Solution; Document Management & Real-time File Mirroring Solution; https://web.archive.org/web/20040711062548/http://www.foldershare.com:80/>; 11, 2004.

FolderShare; Your Files Anywhere; <https://web.archive.org/web/20030722054342/http://foldershare.com:80/>; Jul. 22, 2003.

FolderShare—Secure Remote Access VPN Solution; Document Management & Real-time File Mirroring Solution; <https://web.archive.org/web/20040730030655/http://www.foldershare.com:80/>; Jul. 30, 2004.

FolderShare—Secure Remote Access VPN Solution; Document Management & Real-time File Mirroring Solution; https://web.archive.org/web/20040603205113/http://www.foldershare.com:80/>; Jun. 3, 2004.

FolderShare—Secure Remote Access VPN Solution; Document Management & Real-time File Mirroring Solution; <https://web.archive.org/web/20040613161906/http://www.foldershare.com:80/>; Jun. 13, 2004.

FolderShare Secure Remote Access VPN Solution; Document Management & Real-time File Mirroring Solution; <https://web.archive.org/web/20040629075057/http://www.foldershare.com:80/>; Jun. 29, 2004.

FolderShare—Secure Remote Access VPN Solution; Your Smart File Transfer & Real-time File Mirroring Solution; https://web.archive.org/web/20040316235151/http://foldershare.com:80/>; Mar. 16, 2004.

FolderShare Secure Remote Access VPN Solution; Your Smart File Transfer & Real-time File Mirroring Solution; https://web.archive.org/web/20040325034239/http://www.foldershare.com:80/>; Mar. 25, 2004.

FolderShare Secure Remote Access VPN Solution; Document Management & Real-time File Mirroring Solution; https://web.archive.org/web/20040512211417/http://www.foldershare.com:80/>; May 12, 2004.

FolderShare; Your Files Anywhere; <https://web.archive.org/web/20030531180252/http://www.foldershare.com:80/>; May 31, 2003.

FolderShare Secure Remote Access VPN Solution; Need your files on more than one computer?; <https://web.archive.org/web/20041104031510/http://www.foldershare.com:80/>; Nov. 4, 2004.

FolderShare—Secure Remote Access VPN Solution; Need your files on more than one computer?; <https://web.archive.org/web/20041117092357/http://www.foldershare.com:80/>; Nov. 17, 2004.

FolderShare—Secure Remote Access VPN Solution; Need your files on more than one computer?; <https://web.archive.org/web/20041123085254/http://www.foldershare.com:80/>; Nov. 23, 2004.

FolderShare; Your Files Anywhere; <https://web.archive.org/web/20031128143634/http://foldershare.com:80/>; Nov. 28, 2003.

FolderShare; Your Files Anywhere; <https://web.archive.org/web/20031001071631/http://foldershare.com:80/>; Oct. 1, 2003.

FolderShare Secure Remote Access VPN Solution; Need your files on more than one computer?; <https://web.archive.org/web/20041012083127/http://www.foldershare.com:80/>; Oct. 12, 2004.

(56) References Cited

OTHER PUBLICATIONS

FolderShare Secure Remote Access VPN Solution; Need your files on more than one computer?; <https://web.archive.org/web/20041029085820/http://www.foldershare.com:80/>; Oct. 29, 2004.
FolderShare Secure Remote Access VPN Solution; Need your files on more than one computer?; <https://web.archive.org/web/20040901034646/http://www.foldershare.com:80/>; Sep. 1, 2004.
FolderShare Secure Remote Access VPN Solution; Need your files on more than one computer?; <https://web.archive.org/web/20040909075254/http://www.foldershare.com:80/>; Sep. 9, 2004.
FolderShare; Your Files Anywhere; <https://web.archive.org/web/20030920051943/http://www.foldershare.com:80/>; Sep. 20, 2003.
FolderShare Secure Remote Access VPN Solution; Need your files on more than one computer?; <https://web.archive.org/web/20040924032146/http://www.foldershare.com:80/>; Sep. 24, 2004.
Marshall, M., "The Y Combinator List," Venture Beat, Aug. 2007, Retrieved from the Internet: URL: <https://venturebeat.com/2007/08/16/the-y-combinator-list/>, 4 pages.
Jarvis, A., "Dropbox pitch deck to raise seed capital investment," Medium, Mar. 2018, Retrieved from the Internet: URL: <https://medium.com/@adjblog/dropbox-pitch-deck-to-raise-seed-capital-investment-6a6cd6517e56>, 12 pages.
Microsoft Corporation, Excerpts from Microsoft Computer Dictionary, 5th Ed. Microsoft Press (2002) (9 pages total).
Bush, "As We May Think", The Atlantic Monthly, Jul. 1945, reproduced by Denys Duchier (Apr. 1994) (19 pages total).
Whitehead, WebDAV:Versatile Collaboration Multiprotocol, IEEE Internet Computing, Jan.-Feb. 2005, pp. 66-74 (9 pages total).
Petition for Inter Partes Review, IPR2022-00782, of U.S. Pat. No. 10,067,942 dated Apr. 15, 2022 (90 pages total).
Lewandowski, "Frameworks for Component-Based Client/Server Computing", ACM Computing Surveys, vol. 30, No. 1, Mar. 1998 (25 pages total).
Leiner et al., "Brief History of the Internet", Internet Society, 1997, pp. 1-19 (19 pages total).
Dridi et al., "How to Implement Web-based Groupware Systems based on WebDAV", Proc. of WETICE 99, IEEE 8th Intl. Workshops on Enabling Technologies: Infrastructure for Collaborative Enterprises, Jun. 1999 (7 pages total).
Declaration of Kevin Jakel dated Apr. 12, 2022, submitted in IPR2022-00782 as Exhibit 1011 (7 pages total).
Elsevier B.V., "Three-Way Handshake", https://www.sciencedirect.com/topics/computer-science/three-wayhandshake, accessed Mar. 18, 2022 (9 pages total).
Whitehead et al., "Webdav: IETF Standard for Collaborative Authoring on the Web", IEEE Internet Computing, Sep.-Oct. 1998, pp. 34-40 (7 pages total).
Irmak et al., "Improved Single-Round Protocols for Remote File Synchronization", Proc. IEEE 24th Annual Joint Conference of the IEEE Computer and Communications Societies, 2005, pp. 1665-1676 (12 pages total).
Declaration of Darrell Long, Ph.D. dated Apr. 14, 2022, submitted in IPR2022-00782 as Exhibit 1005 (119 pages total).
Banga et al., "Measuring the Capacity of a Web Server", Proceedings of the USENIX Symposium on Internet Technologies and Systems, Dec. 1997 (12 pages total).
Birrell et al., "Grapevine: An Exercise in Distributed Computing", Communications of the ACM, Apr. 1982, vol. 25, No. 4, pp. 260-274 (15 pages total).
Rasch et al., "In-Place Rsync: File Synchronization for Mobile and Wireless Devices", Proceedings of the FREENIX Track: 2003 USENIX Annual Technical Conference, 2003, pp. 91-100 (11 pages total).

\* cited by examiner

ARCHITECTURE FOR MANAGEMENT OF DIGITAL FILES ACROSS DISTRIBUTED NETWORK

CROSS-REFERENCE TO RELATED APPLICATIONS

This application is a continuation of U.S. patent application Ser. No. 17/306,548, filed May 3, 2021, which is a continuation of Ser. No. 16/361,641 filed Mar. 22, 2019, now issued as U.S. Pat. No. 11,003,622 on May 11, 2021, which is a continuation of Ser. No. 16/017,348 filed Jun. 25, 2018, now issued as U.S. Pat. No. 10,289,607 on May 14, 2019, which is a continuation of U.S. application Ser. No. 14/860,289 filed Sep. 21, 2015, now issued as U.S. Pat. No. 10,067,942 on Sep. 4, 2018, which is a continuation of U.S. patent application Ser. No. 12/267,852, filed Nov. 10, 2008, now issued as U.S. Pat. No. 9,143,561 which claims priority to U.S. Provisional Application No. 60/986,896 entitled "ARCHITECTURE FOR MANAGEMENT OF DIGITAL FILES ACROSS DISTRIBUTED NETWORK" and filed Nov. 9, 2007, and the contents of the aforementioned applications are hereby incorporated by reference in their entirety.

FIELD OF THE INVENTION

This invention relates generally to computer-implemented processes and, more specifically, to sharing of electronic files among electronic devices.

BACKGROUND OF THE INVENTION

Users of modern computing systems are increasingly finding themselves in constantly-connected, high-speed networked environments. The Web continues to be a killer application, second only to email, on the Internet. Further, customers are increasingly using more than one computing device; a customer may have a desktop computer at home, one at work, and a constantly connected "smart phone". Due to the confluence of these two trends, file management across these devices has become a problem.

Although modern devices are easily connected, they do not provide the customer a seamless environment; the customer must manually handle many aspects of that connection. With regards to file management, customers must manually move files between their devices using some protocol like email, ftp, or by posting them on the Web. These practices lead to problems that include:

The proliferation of redundant file copies. This proliferation creates a confusing environment where the customer is unclear where the "official" or newest version of a file exists.

The creation of an error-prone environment. Some documents, such as those associated with word processing and desktop publishing, externally reference other files. Copying such a document can break these references causing errors that the customer has to handle manually. An example of such a document is a desktop publishing document that contains a reference to an image. If that image file is not transferred along with the desktop publishing file, the image will appear as a broken link.

Unnecessary complexity. Because devices tend to have their own filing system, customers must manage a different filing model on each of his devices. For example, instead of having a single "Movies" folder, he may have to deal with many "Movies" folders, which may be in different locations on each of his devices. Each device may also have its own security model, further complicating the matter.

That a customer has to manually move files around to ensure their accessibility on his devices is unnecessary, and is an indicator of a lack of customer-focused design in modern file systems. File systems in use today are direct offspring of systems used when graphical customer interfaces were nonexistent. Modern file system customer interfaces, such as Windows® Explorer and Mac OS X's Finder are just now starting to provide experiences that are more in line to a customer's workflow. Whereas, before, these interfaces were concerned with representing files with abstracted icons, the file's actual contents are becoming paramount in how files are organized and presented.

Problems still exist with how these newer customer interfaces are implemented. They are not completely integrated with applications, suffer from performance problems, and do not generally work well outside of a device's local file system.

There are several solutions to this problem that are in one way or another inadequate to the task:

Remote Desktop software allows a customer to remotely "see" his desktop. Remote desktop software screen-scrapes a remote machine's screen (a "server") and displays it on a screen local to the customer (a "client"). Remote desktop gives a customer access to not only his files, but also to his applications. However, this approach requires that the host machine be turned on and connected to the internet at all times. Consequently, this approach would not be appropriate for mobile hosts such as laptops. Remote desktop does not use the resources of a local machine. For full accessibility, the customer would have to keep all files and application on the host machine as any files stored on a client are not guaranteed to be accessible.

Distributed File Systems, like remote desktop software, place data on an always-connected host machine. Unlike remote desktop software, the host machine is not one on which the customer performs computing tasks. The host machine is used as a storage mechanism, and any computation performed on that machine serves to supports its use as such. Distributed file systems generally provide the right functionality for customers to share files between their devices. However, distributed file systems are usually deployed as a shared resource; that is, other customers have access to it. Because of this sharing, a customer's files may be buried deep in a filing structure, and it may not always be immediately evident to customers what kind of access they have to a particular file. Further, to use a distributed file system, the customer must always be connected to it. Files stored on a distributed file system are generally inaccessible if the customer's machine is not connected to it, unless the customer has copied or moved the files to his machine's local hard drive. However, doing so immediately creates the problem of having two filing systems for the same file, creating a mental burden on the customer.

Additionally, accessing a file located on a distributed file system tends to be slower than accessing files on the local hard drive. Modern applications are usually written to assume that the files they access are located locally, and thus are not optimized to access remote files. When these applications are used with remote files, they can lose performance by an order of magnitude. This problem can be fixed by automatically caching often-used files on the local file system, and only synchronizing them when they have been changed. However, this separate synchronization step introduces another problem: because the synchronization process can be lengthy, the customer is never entirely sure if the file he is remotely accessing is the latest version of the file, versus an earlier one that has been marked to be updated. Further, the directory may not reflect the existence of the file at all until synchronization finishes.

FTP is similar to a distributed file system with regards to files being hosted on a remote server. However FTP generally does manifest as a "disk drive" on the customer's desktop; the customer must use special FTP client software to access an FTP server. It shares the same problem as distributed file systems, with the additional problem of weak integration with applications. Applications can generally write and read files directly to and from a distributed file system. This is not the case with FTP, as the customer has to manually use the client software to perform these operations as a separate task.

Email was originally invented for messaging. From the beginning, the model it employs to make files accessible remotely is necessarily inefficient. Email's model for making files accessible is in the form of an email "attachment". Attachments are so named because they piggy-back on a message sent from one customer to another. A customer can make a file remotely available using email by attaching the file to an email and sending it to himself. He can then retrieve the file from a remote location by accessing the message on the email server. Email used in this way is even worse than FTP as the process is even more manual: a customer must find the message containing the file before he can even access it. Further, the location in which the attachment lives is read only. If the customer, for example, were to open the file, change it, then save it back out, the results would be ambiguous to the user because the email application, not the user, specified its location. Usually, the saved file would end up buried in an email file cache in an undisclosed area of the file system.

Flash Drives and External Disk Drives, although seemingly the most "primitive" way to ensure file availability, avoid all the problems related to network latency. However, these devices must be physically connected to the computer on which the files will be accessed. These restrictions preclude the customer from employing several effective work-flows including: using more than one computer to complete a single task (the files can only be accessed on one computer) and setting up an automated backup (the computer running the backup can't guarantee that the storage device will be connected come backup time). Further, to ensure full availability of the files, the customer must carry the device with them at all times, and must follow the associated protocols for mounting and dismounting the device.

Other problems with the prior art not described above can also be overcome using the teachings of embodiments of the present invention, as would be readily apparent to one of ordinary skill in the art after reading this disclosure.

SUMMARY OF THE INVENTION

In an embodiment, a system includes a first application executable on a first electronic device. The system further includes a second application executable on a second electronic device in communication with the first electronic device. The second electronic device is configured to store a first electronic file. Subsequent to a user modifying the first electronic file, the second application is operable to automatically transfer the modified first electronic file, or a copy thereof, to the first electronic device. The system further includes a third application executable on a third electronic device in communication with the first electronic device. The third electronic device is configured to store a second electronic file. Subsequent to the user modifying the second electronic file, the third application is operable to automatically transfer the modified second electronic file, or a copy thereof, to the first electronic device. The first application is operable to automatically transfer the modified first electronic file or copy to the third electronic device, and automatically transfer the modified second electronic file or copy to the second electronic device.

BRIEF DESCRIPTION OF THE DRAWING

Preferred and alternative embodiments of the present invention are described in detail below with reference to the following drawings.

DETAILED DESCRIPTION OF THE PREFERRED EMBODIMENT

An embodiment of the invention leverages remote programming concepts by utilizing processes called mobile agents (sometimes referred to as mobile objects or agent objects). Generally speaking, these concepts provide the ability for an object (the mobile agent object) existing on a first ("host") computer system to transplant itself to a second ("remote host") computer system while preserving its current execution state. The operation of a mobile agent object is described briefly below.

The instructions of the mobile agent object, its preserved execution state, and other objects owned by the mobile agent object are packaged, or "encoded," to generate a string of data that is configured so that the string of data can be transported by all standard means of communication over a computer network. Once transported to the remote host, the string of data is decoded to generate a computer process, still called the mobile agent object, within the remote host system. The decoded mobile agent object includes those objects encoded as described above and remains in its preserved execution state. The remote host computer system resumes execution of the mobile agent object which is now operating in the remote host environment.

While now operating in the new environment, the instructions of the mobile agent object are executed by the remote host to perform operations of any complexity, including defining, creating, and manipulating data objects and interacting with other remote host computer objects.

File transfer and/or synchronization, according to an embodiment, may be accomplished using some or all of the concepts described in commonly owned U.S. patent application Ser. No. 11/739,083, entitled "Electronic File Sharing," the entirety of which is incorporated by reference as if fully set forth herein.

Figure 1:
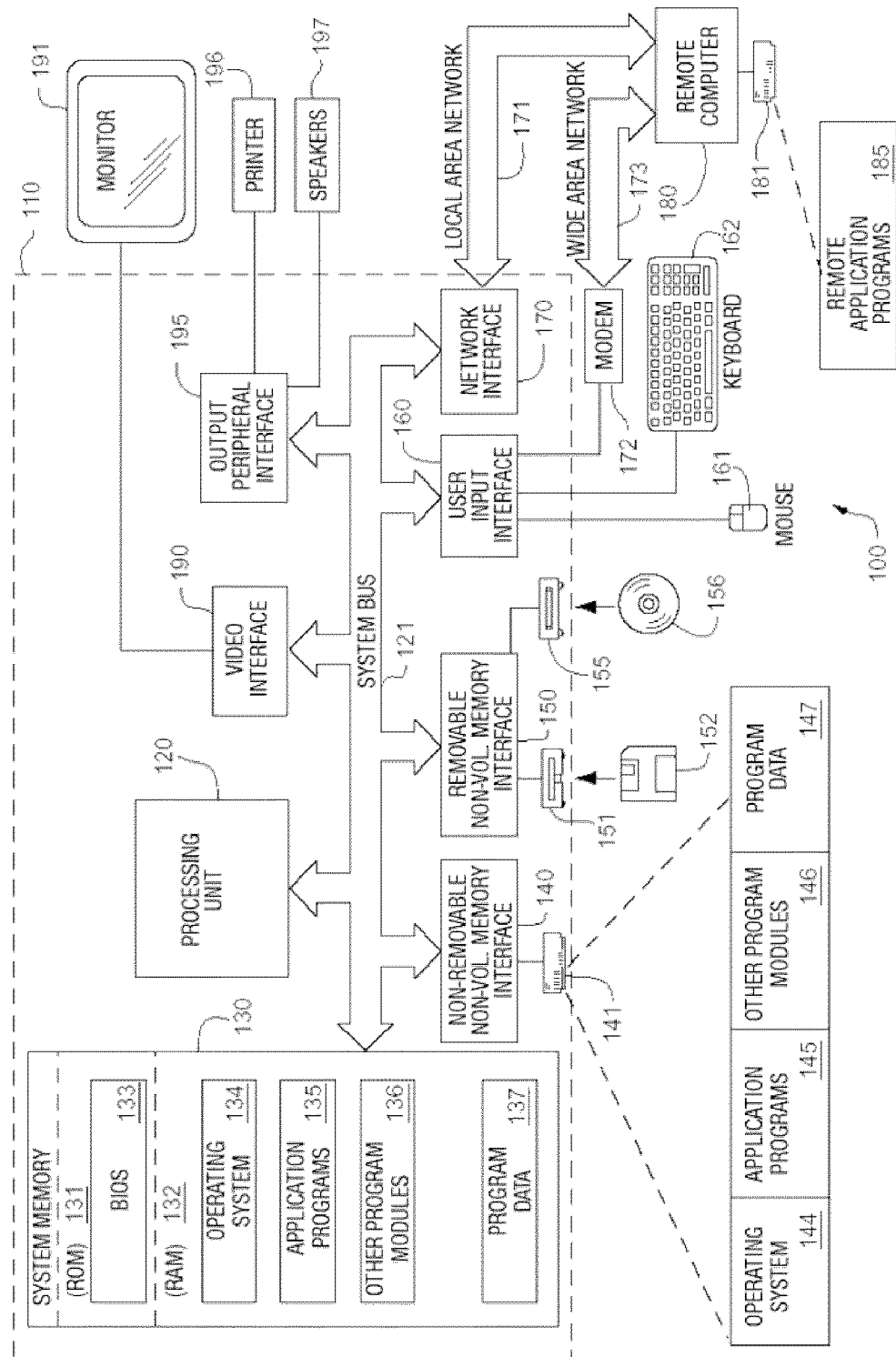
FIG. 1 is a schematic view of an exemplary operating environment in which an embodiment of the invention can be implemented.

FIG. 1 illustrates an example of a suitable computing system environment 100 in which one or more embodiments of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
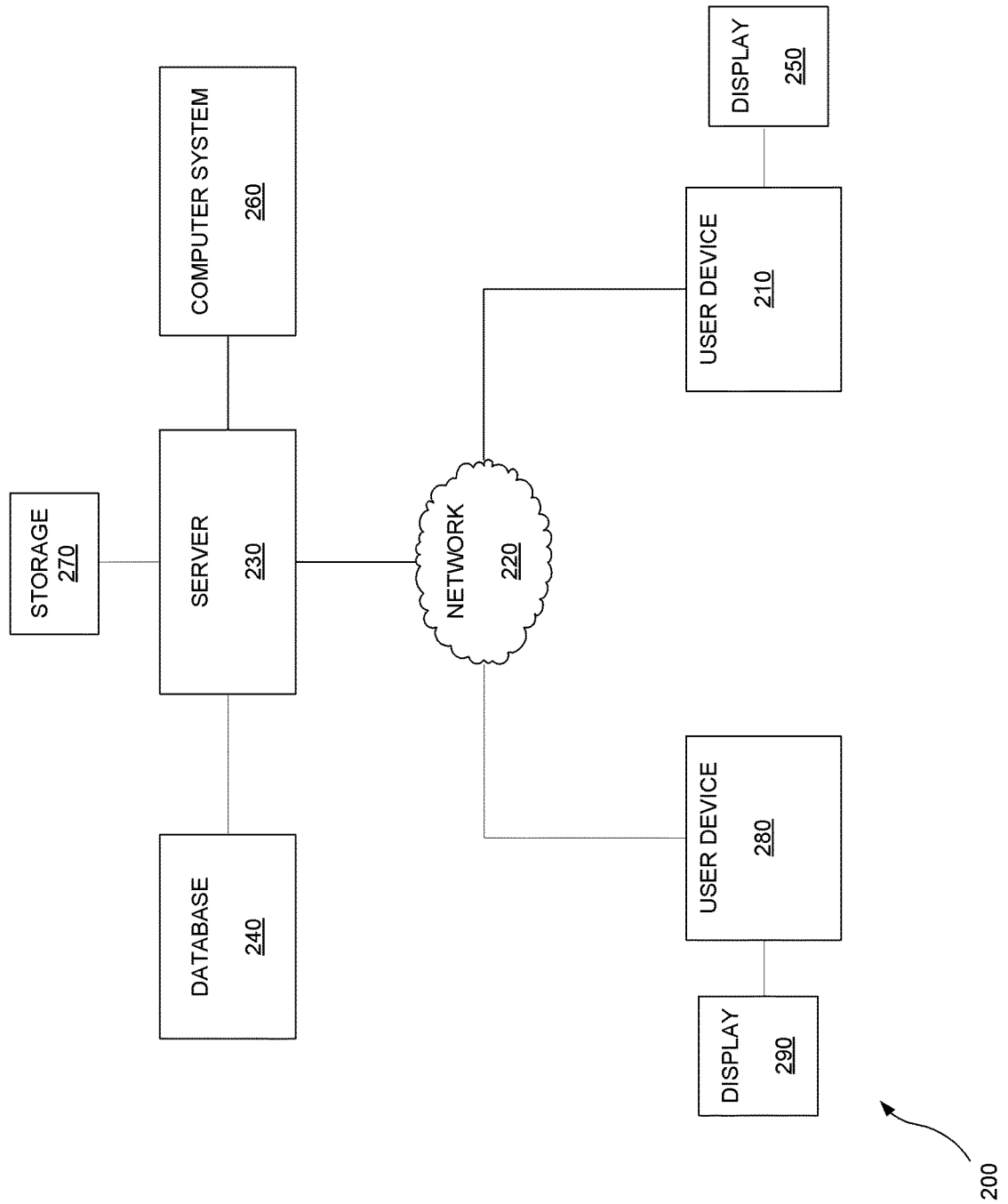
FIG. 2 is a functional block diagram of an exemplary operating environment in which an embodiment of the invention can be implemented.

Referring now to FIG. 2, an embodiment of the present invention can be described in the context of an exemplary computer network system 200 as illustrated. System 200 includes electronic user devices 210, 280, such as personal computers or workstations, that are linked via a communication medium, such as a network 220 (e.g., the Internet), to an electronic device or system, such as a server 230. The server 230 may further be coupled, or otherwise have access, to a database 240, electronic storage 270 and a computer system 260. Although the embodiment illustrated in FIG. 2 includes one server 230 coupled to two user devices 210, 280 via the network 220, it should be recognized that embodiments of the invention may be implemented using two or more such user devices coupled to one or more such servers.

In an embodiment, each of the user devices 210, 280 and server 230 may include all or fewer than all of the features associated with the computer 110 illustrated in and discussed with reference to FIG. 1. User devices 210, 280 include or are otherwise coupled to a computer screen or display 250, 290, respectively. User devices 210, 280 can be used for various purposes including both network- and local-computing processes.

The user devices 210, 280 are linked via the network 220 to server 230 so that computer programs, such as, for example, a browser or other applications, running on one or more of the user devices 210, 280 can cooperate in two-way communication with server 230 and one or more applications running on server 230. Server 230 may be coupled to database 240 and/or electronic storage 270 to retrieve information therefrom and to store information thereto. Additionally, the server 230 may be coupled to the computer system 260 in a manner allowing the server to delegate certain processing functions to the computer system.

Figure 3:
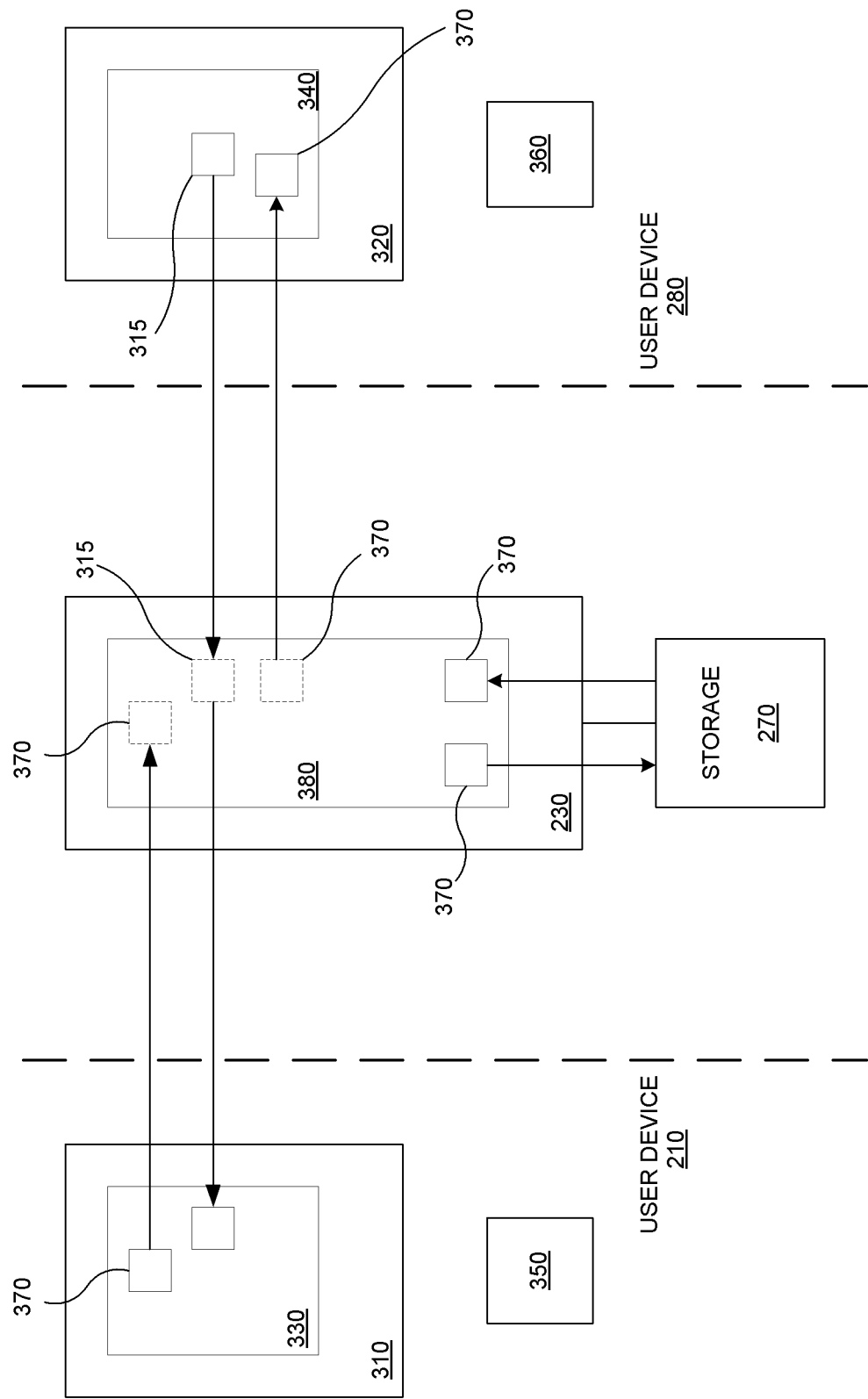
FIG. 3 is a functional block diagram illustrating file sharing and/or synchronization according to an embodiment of the invention.

Referring now to FIG. 3, illustrated is functionality of an embodiment of the invention allowing a user (not shown) who owns or otherwise controls devices 210, 280 to automatically maintain file synchronization between at least devices 210, 280, or any other user devices on which principles of the present invention are implemented. In an embodiment, an administrator (not shown) of the server 230 or other appropriate electronic device transfers a file-transfer and/or synchronization application to the user devices 210, 280 for installation thereon. Once installed on the user devices 210, 280, the file-transfer application provides file-transfer clients 310, 320 executable by the user devices 210, 280, respectively. Each of the file-transfer clients 310, 320 may, but need not, include a respective mobile-agent runtime environment 330, 340. The mobile-agent runtime environment 330, 340 include portions of memory of the user devices 210, 280 dedicated to allowing a mobile object the ability to perform operations that the mobile object is programmed to carry out. Also included in the file-transfer application are user interfaces 350, 360 that are displayable on the displays 250, 290, respectively. In an embodiment, the interfaces 350, 360 allow a user to view, access and/or organize files to be synched among the various user devices.

Generally, all files that the user desires to be synched or shared may at some point be uploaded by one or more of the user devices 210, 280 and stored in storage 270. Upon receiving the files to be synched, the server 230 can store such files in the storage 270 and/or transfer the files to one or more of the respective hard drives of the user devices 210, 280, thereby enabling each respective user device to access such files. In this manner, the server 230 is operable to treat each hard drive of the respective user devices 210, 280 as a local document cache for files received by the server. Typically, the server 230 will store one or more of the received files to the storage 270 only if the destination user device is offline or otherwise temporarily not in communication with the server 230. Upon resuming communication with the destination user device, the server 230 will transfer the temporarily stored files to the destination device.

In operation, according to an embodiment, the user may open and modify a file 370, such as a word-processing document or other electronic file. Alternatively, the user may create a first instance of the file 370. The user may have previously have associated, or may now associate, the file 370 with the transfer client 310. Upon a predetermined and user-configurable triggering event, the transfer client 310 transfers the modified file 370, or a copy of the modified file, to the server 230. Such a triggering event may include, but be not limited to, the user saving the file, the elapsing of a predetermined amount of time during which the file has been opened, or the re-initiation of a communication session between the device 210 and the server 230.

The file 370 is transferred to the server 230 on which is executing a synchronization application 380, which may include a mobile-agent runtime environment. Through user configuration, the synch application 380 monitors a set of user devices to which the file 370 should be transferred to effect file synchronization. In the illustrated embodiment, this set of user devices includes the user device 280. The synch application 380 polls the device 280 to determine whether the device 280 is in communication with the server 230. If the device 280 is in communication with the server 230, the synch application 380 transfers the file 370 to the device 280, whereupon the transfer client 320 resident on the device 280 replaces the previous version of the file 370, previously cached on the device 280, with the latest version of the file 370 modified on the user device 210. If the device 280 is not currently in communication with the server 230, the synch application 380 may store the file 370 in the storage 270 until such time as communication between the device 280 and server 230 is reestablished. As illustrated in FIG. 3, a similar reverse-direction synchronization process may be performed by the synch application 380 and the transfer clients 310, 320 with regard to a file 315 modified on device 280 and synchronized to device 210.

In an embodiment, the user interfaces 350, 360 may include a list of the customer's documents and related metadata, as well as any one-to-one or one-to-many relationships between the documents and metadata. An embodiment can always provide customers with an accurate "picture" of their document collection, regardless of whether their devices physically contain the documents. As alluded to earlier, a problem with distributed file systems and FTP is the latency between a file being put onto a file system and it showing up on a remote machine. To prevent this problem, an embodiment directory is decoupled from the movement of files. An embodiment's directory update system updates at a higher priority than the documents to be synchronized. This feature ensures that when a customer browses or searches through his set of documents, they appear even if they have not yet been cached locally on the user device. An indicator signifying a document's availability may be prominently displayed adjacent to the document's representation so that customers are aware of the document's availability.

An embodiment may include a stand-alone application that allows customers to find and manage documents associated with transfer clients 310, 320 by visualizing relationships between documents and their metadata. It allows customers to tag documents with any number of identifiers. Customers can relate both documents and tags with each other in any number of user-specified one-to-one and one-to-many relationships, and an embodiment provides a user interface to browse and search on these relationships. To mitigate the customers' learning curve, an embodiment can implement relationships common to contemporary file systems, including a folder hierarchy. In addition to this, an embodiment provides direct support for methods that the customer uses to organize documents by manifesting them as user interface idioms. This is unlike conventional document filing systems which require the customer to work within a strict folder metaphor for organization.

Some alternate methods that an embodiment supports for organizing documents include:
  Allow customers to organize their documents by application. Many times customers remember the application used to create a document instead of the document's name or its location in a hierarchy.
  Allow customers to organize their documents by most recent access. Customers are likely to access a document they've accessed in the near past. Usually, such documents are part of a task that the customer is actively working.
  Allow customers to organize their documents by project or subproject.
  Allow customers to organize their documents by people. Many times, especially in the context of a collaboration, a document is directly related to one or more people other than the customer.
  Allow the customer to organize their document by process stage. Documents may represent one or more stages of a process. Customers need a method for organizing documents by process stage, and a mechanism for moving the document through a set of predefined stages.
  Allow customers to organize their documents by any of the aforementioned methods concurrently. These organization methods are not mutually exclusive.

An embodiment presents an interface that allows a customer to locate one or more documents associated with the transfer clients 310, 320 and open such document into a separate software application. Since this interface is intended to be used from within the separate application, that application may need to know how to invoke such interface. Advantageously, this invocation behavior can be provided to the application using the application's plug-in API.

An embodiment presents an interface that allows a customer to synchronize a currently opened document according to processes described elsewhere herein. This interface can be invoked within an application and can be made available to the application in the manner described above in connection with the application's plug-in API.

Some files associated with the transfer clients 310, 320 are dependent on other files associated with the transfer clients 310, 320. For example, a desktop publishing document may include images that are stored in files separate from the main document. Previous file-synching solutions treat these files as separate. Because of this, for example, a document synchronized from the device 210 to the device 280 may be opened by the user of the device 280 before the image files have been fully transferred to the device 280. This causes the document to fail to open, or break, since the image files don't exist or are incomplete. An embodiment prevents this by: (1) always ensuring the file catalog (e.g., the stand-alone application that allows customers to find and manage documents associated with transfer clients 310, 320, as discussed above herein) is synchronized before any file data is synchronized, and (2) pausing any file access by any program until the file contents have been fully synchronized. In such an embodiment, if a user attempts, using a software program, to open a file whose related files haven't yet finished transferring to the local (hard drive) cache, if that software attempts to open the related files, the software program is blocked by an embodiment until the requested files are downloaded and ready to access.

Other file sending and synchronizing software requires the user to upload their data to a storage device owned by the operator of the service. An embodiment treats storage as a participant in the synchronization process; this means that the user can choose the service or device where their files will be stored. The file transfer/synching is abstracted from the storage system allowing any storage to be used. An embodiment treats storage like any other synch target, such as a desktop computer, or a cell phone. As such, any device owned or otherwise controlled by the user and running a synch application, such as synch application 380, as provided in an embodiment of the invention can perform the storage and/or synching functions described elsewhere herein. That is, the user device 280 or user device 210, rather than the server 230, may perform such functions.

While a preferred embodiment of the invention has been illustrated and described, as noted above, many changes can be made without departing from the spirit and scope of the invention. For example, as an alternative to the approach described with reference to FIG. 3, wherein the transfer clients 310, 320 function to "push" modified or created files to the synch application 380, the synch application 380 may instead function to periodically "pull" or otherwise actively retrieve such files from the transfer clients 310, 320 Instead, the invention should be determined entirely by reference to the claims that follow.

The invention claimed is:

1. A system comprising:
a server system that transfers a file-transfer application to a first client device and a second client device for installation thereon, the server system comprising one or more processors programmed with computer program instructions that, when executed, cause the server system to:
based on a content of a first file locally stored on the first client device being modified, automatically receive, over a network, a copy of the modified first file from a first transfer client, implemented on the first client device based on the file-transfer application installed thereon, the copy of the modified first file being an updated version of the first file that is generated from the content of the first file being modified;
receive, over a network, from the first transfer client, first metadata associated with the updated version of the first file that is generated from the content of the first file being modified, the first metadata being assigned a first priority greater than a second priority assigned to the copy of the modified first file; and
automatically transfer, based on the first priority being greater than the second priority, the first metadata over a network to a second transfer client, implemented on the second client device based on the file-transfer application installed thereon, such that the first metadata is transferred to the second transfer client before the copy of the modified first file is transferred to the second transfer client to be stored on the second client device,
wherein the file-transfer application includes a user interface that displays a list of files that are to be synched across client devices and related metadata of each file, and
wherein, before the copy of the modified first file is transferred to the second transfer client:
the transfer of the first metadata to the second transfer client causes the user interface of the second client device to be updated to include an indicator that the updated version of the first file is available, and
the indicator included in the updated user interface of the second client device represents the updated version of the first file that is currently stored on the first client device and not currently stored on the second client device.

2. The system of claim 1, wherein the computer program instructions, when executed, cause the server system to, after the transfer of the first metadata to the second transfer client, transfer the copy of the modified first file to the second transfer client to replace an older version of the first file locally stored on the second client device.

3. The system of claim 1, wherein the server system comprises a priority assignment configuration to assign greater priority to metadata associated with files than priority assigned to the files such that, when transferring the first metadata to the second transfer client, the server system assigns the first priority to the first metadata and the second priority to the copy of the modified first file based on the priority assignment configuration.

4. The system of claim 1, wherein the first transfer client comprises a priority assignment configuration to assign greater priority to metadata associated with files than priority assigned to the files such that, when transferring the first metadata to the server system, the first transfer client assigns the first priority to the first metadata and the second priority to the copy of the modified first file based on the priority assignment configuration.

5. The system of claim 1, wherein he computer program instructions, when executed, cause the server system to, based on a predetermined triggering event, receive the copy of the modified first file from the first transfer client,
the predetermined triggering event includes at least one of a user of the first client devices saving the modified first file, or re-initiation of a communication session between the first client device and the server system.

6. The system of claim 1, wherein the computer program instructions, when executed, cause the server system to, while the user interface of the second client device is caused to be updated, pause any access to the first file on the second client device until the copy of the modified first file is transferred to the second transfer client to replace an older version stored on the second client device.

7. The system of claim 1, wherein, prior to the modification, the content of the first file is stored on a local hard drive, and
the copy of the modified first file is automatically received from the first transfer client based on the modified content of the first file being saved back to the first file on the local hard drive of the first client device.

8. The system of claim 7, wherein the modified content of the first file being saved is based on a user operation to save the modified content of the first file on the local hard drive of the first client device.

9. The system of claim 1, wherein the first file has previously been associated with the first transfer client, prior to the copy of the modified first file being transmitted from the first transfer client to the server system.

10. The system of claim 1, wherein the file-transfer application is a stand-alone application.

11. The system of claim 10, wherein the file-transfer application allows a user of the first client device to manage, via the user interface of the first client device, files associated with the first transfer client and the second transfer client by using metadata of the files.

12. The system of claim 10, wherein the file-transfer application allows a user of the first client device to locate, via the user interface of the first client device, one or more files associated with the first transfer client and open the located one or more files into a separate software application.

13. The system of claim 12, wherein the file-transfer application allows the user of the first client device to, based on modification to a currently opened file on the first client device, synchronize the currently opened file with the second client device based on a plug-in application programming interface (API) of the file-transfer application.

14. The system of claim 1, wherein the first file is a word-processing document or another electronic file.

* * * * *